United States Patent [19]
Pike

[11] Patent Number: 4,821,159
[45] Date of Patent: Apr. 11, 1989

[54] OVERLAPPED LAMP SWIVEL FOR AFTER ASSEMBLY FINISHING

[75] Inventor: Louis D. Pike, Moreland Hills, Ohio

[73] Assignee: Pike Machine Products Co., Cleveland, Ohio

[21] Appl. No.: 149,740

[22] Filed: Jan. 29, 1988

[51] Int. Cl.⁴ .............................................. F21S 1/02
[52] U.S. Cl. .................... 362/285; 362/427; 362/432; 248/282; 403/164
[58] Field of Search ............... 362/285, 418, 427, 431, 362/432; 248/282, 283; 403/119, 164, 165

[56] References Cited

U.S. PATENT DOCUMENTS

| | | | |
|---|---|---|---|
| 3,678,265 | 7/1972 | Porter et al. | 362/427 |
| 4,247,886 | 1/1981 | Warshwsky | 362/427 |
| 4,347,557 | 8/1982 | Warshawsky | 362/432 |
| 4,381,538 | 4/1983 | Warshawsky | 362/427 |
| 4,386,393 | 5/1983 | Pike | 362/427 |
| 4,427,382 | 1/1984 | Hoffmeister et al. | 248/282 |
| 4,459,650 | 7/1984 | Pike | 362/427 |
| 4,605,995 | 8/1986 | Pike | 362/427 |
| 4,726,552 | 2/1988 | Warshawsky | 362/427 |

Primary Examiner—Ira S. Lazarus
Assistant Examiner—Richard R. Cole
Attorney, Agent, or Firm—Fay, Sharpe, Beall, Fagan, Minnich & McKee

[57] ABSTRACT

A lamp arm assembly includes at least one swivel assembly (A,D) and tubular arms (90, 150) for supporting a lighting fixture (E). The swivel assemblies include at least a first swivel member (10, 100) and a second swivel member (30, 120). Each swivel member has a peripheral outer surface (12, 102, 32, 122) and an interior passage (14, 34, 104, 124). One of the swivel members includes an annular collar (16, 106) projecting into the inner passage and the other includes a ferrule (36, 126) which is received in the annular collar and crimped thereto. The swivel members have bearing surfaces (18, 38, 108, 128) around the ferrule which are urged into firm frictional engagement by the crimping. One of the bearing surfaces is supported on a cylindrical supporting portion (44, 130) and the other has a skirt (40, 108) with a cylindrical inner surface. The cylindrical surfaces of the skirt and the bearing surface supporting portion are sufficiently different to form an annular gap. The gap is selected to be sufficiently large relative to the wetting characteristics of a selected coating material that when the swivel members are coated the coating material does not bridge the gap. In this manner, the skirt hides the peripheral edge around the interface between the first and second bearing surfaces such that any coating damage caused by the coating material bridging the interface is blocked from view.

17 Claims, 3 Drawing Sheets

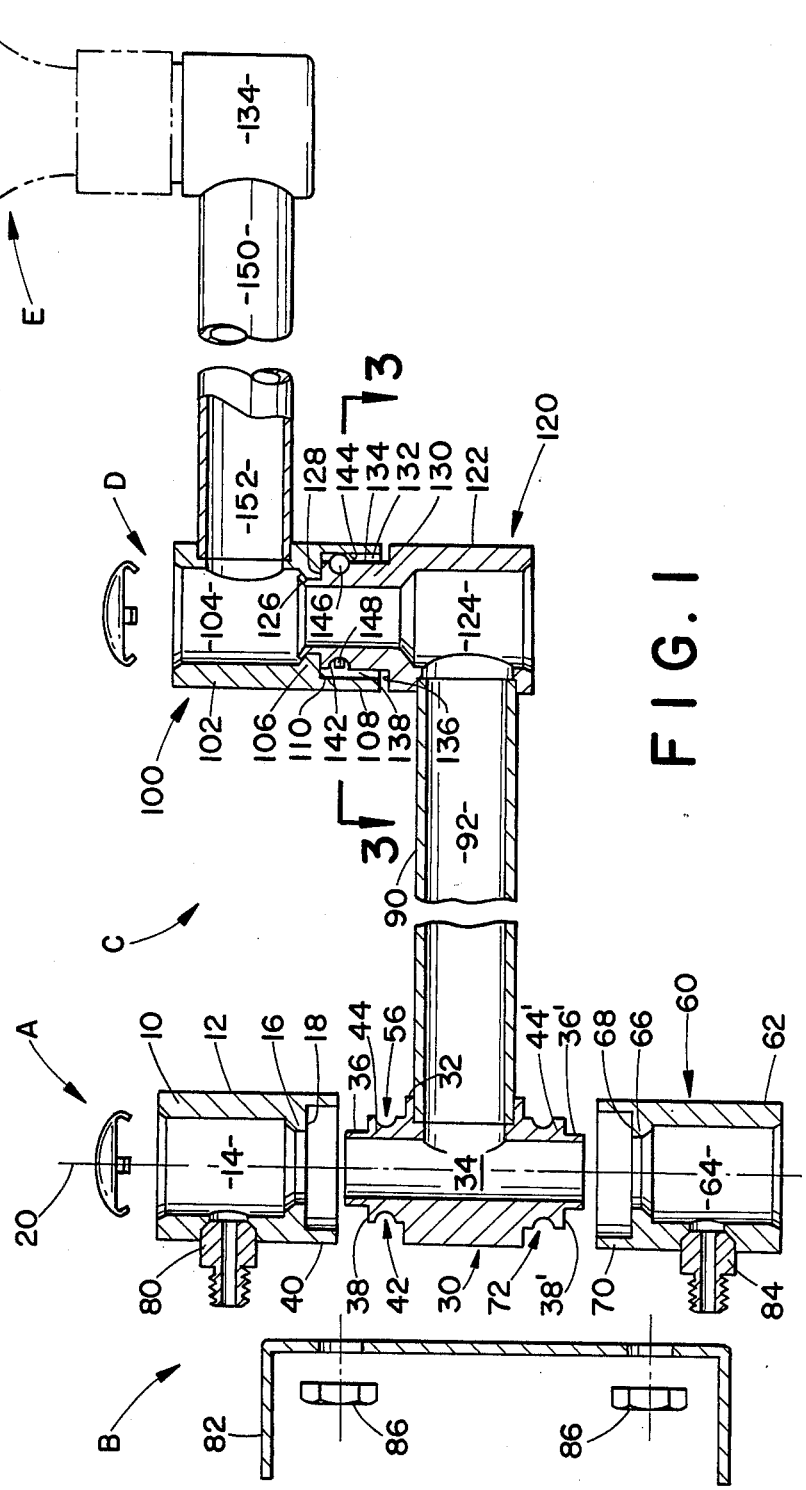

OVERLAPPED LAMP SWIVEL FOR AFTER ASSEMBLY FINISHING

BACKGROUND OF THE INVENTION

The present invention relates to the art of swivel joints. It finds particular application in conjunction with swivel joints for supporting swiveling lamp arms and will be described with particular reference thereto. It is to be appreciated, however, that the invention is also applicable to other pivotal connections and joints. The invention will find utility in pivotally connecting members for other purposes, including fluid carrying members, structural members for supporting decorative and functional appliances, such as shaving mirrors, candle sconces, personal computer accessories, and the like.

Heretofore, lamp swivels have commonly included two or three cylindrical members interconnected end to end and defining a wire receiving passage extending therethrough. Adjacent swivel members have abutting upper and lower bearing surfaces for rotational, sliding contact. For maximum stability and freedom from wobbling, the bearing surfaces extended to the outer periphery of the swivel members. A ferrule was normally extended from one of the members through an interior collar in the other and was crimped or swaged thereto. The force with which the ferrule was crimped determined the degree of frictional engagement between the bearing surfaces, hence, the freedom or resistance to rotational movement. By crimping the ferrule harder, a stiffer swivel was created; by crimping the ferrule more loosely, a more free turning swivel was formed.

Commonly, the swivel members had the same circular outer diameter such that the outer surfaces thereof formed a continuous cylinder. Because the bearing surfaces were pressed into such firm, frictional contact that the attached arms did not wobble, the mating of the bearing surfaces formed only a small annular ring or gap around the swivel.

During assembly, the tubular steel arms were brazed to swivel members. The ferrule of one member was swaged to the annular collar of the next connecting the members rotatably together. Thereafter, the swivel and arm assemblies were plated, e.g. brass or chrome plating. Plating is rarely done prior to assembly. The close tolerances of the mating surfaces required for smooth rotational movement would be disturbed. Masking the bearing surfaces before coating is labor intensive, hence, expensive. Further, the finish would become damaged in handling as the parts are crimped together or joint lubrication could seep onto the finish and mar it.

In a normal plating operation, the swivel and arm assemblies were dipped in acid or other etching and plating solutions. Sometimes a small amount of acid or other plating solutions would be trapped between the bearing surfaces of the two swivel members. After the plating was completed, the trapped acid or other etching solution would leak out from between the bearing surfaces and onto the plated surface of the swivel members. The acid and other etching solutions commonly discolored or otherwise adversely affected the plated surface.

Powder coatings have become stylish for analogous applications and are commonly requested. However, powder coating has heretofore been unavailable on swivel members. Powder coatings are relatively thick and bridge small gaps or cracks. If a swivel member were powder coated, the powder coating would form a continuous surface and bridge the annular gap at the peripheral interface between bearing surfaces of the two swivel members. When the two swivel members were rotated relative to each other, the brittle powder coating layer cracked or chipped adjacent the peripheral bearing surface interface or gap.

The present invention contemplates a new and improved swivel assembly which overcomes the above referenced plating and powder coating problems and others.

SUMMARY OF THE INVENTION

In accordance with one aspect of the present invention, a lamp assembly is provided. At least first and second swivel members are rotatably interconnected to undergo rotating movement about a swivel axis. The first and second swivel members have abutting, bearing surfaces in firm frictional engagement with each other. One of the swivel members has a depending skirt which overhangs and is displaced from a peripheral edge of an intersection between the frictional bearing surfaces. The skirt also overhangs an exterior surface of the swivel members such that the intersection peripheral edge is obscured from view.

In accordance with another aspect of the present invention, an outer peripheral edge of the bearing surfaces is recessed inward from the outer surface of the swivel members.

In accordance with a yet more limited aspect of the present invention, both swivel members and the skirt have a circular outer surface of substantially the same diameter. The skirt is connected to the first swivel member and displaced from the second by a significant annular gap.

A first advantage of the present invention is that the outer periphery of the bearing surface interface is hidden from view.

Another advantage of the present invention is that it facilitates powder coating or plating lamp swivel assemblies.

Another advantage of the present invention is that it reduces scrapping arm assemblies due to coating defects adjacent the peripheral interface between the swivel members.

Yet another advantage of the present invention is that it presents a stylish and attractive appearance.

Still further advantages of the present invention will become apparent to those of ordinary skill in the art upon reading and understanding the following detailed description of the preferred embodiments.

BRIEF DESCRIPTION OF THE DRAWINGS

The present invention may take form in various parts and arrangements of parts or in various steps and arrangements of steps. The drawings are only for purposes of illustrating a preferred embodiment and are not to be construed as limiting the invention.

FIG. 1 is a partially exploded view in partial section of a wall mountable swivel lamp assembly;

DETAILED DESCRIPTION OF THE PREFERRED EMBODIMENTS

Figure 3:
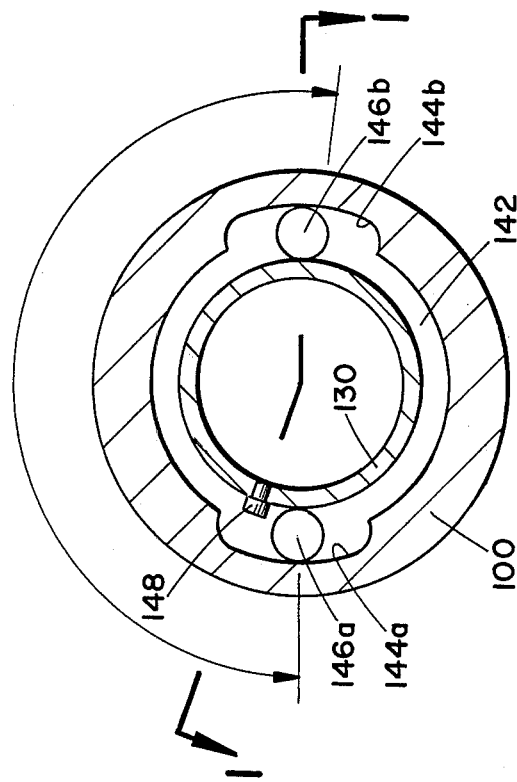
FIG. 3 is a sectional view through section 3—3 of the second swivel assembly of FIG. 1.

With reference to FIG. 1 the lamp swivel arm assembly includes a first or wall mounted swivel assembly A. A mounting means B fixedly mounts the first swivel assembly A to a wall, a lamp base, a rod, or other supporting structure. An arm assembly C including a second swivel assembly D rotatably connects a lighting fixture E with the first or wall mounted swivel assembly A.

The first swivel assembly A includes a first swivel member 10 which has a circularly cylindrical exterior surface 12 and defines a wire receiving passage 14 centrally therein. An annular shoulder or constriction 16 is defined adjacent a lower end of the wire receiving passage 14. A first bearing surface 18 is disposed perpendicular to a central pivot axis 20. In the preferred embodiment, the bearing surface is a planar surface with a circular radius that is smaller than the radius of the first member outer surface 12.

A second, male swivel member 30 has an outer circularly cylindrical surface 32. Preferably, the second outer peripheral surface has the same radius from the central pivot axis 20 as the first peripheral surface 12. An interior wire passage 34 is defined in communication with the first wire passage 14. A projecting sleeve or ferrule 36 passes rotatably through the aperture in the peripheral collar 16. The ends of the ferrule are swaged or pressed against the annular collar such that an upper, second member bearing surface 38 is pressed into firm frictional contact with the first member lower bearing surface 18. The second bearing surface in the illustrated embodiment is, again, an annular planar region that is perpendicular to the swivel axis 20. However, the second bearing surface 38 has a smaller radius than the first bearing surface 18.

Figure 2:
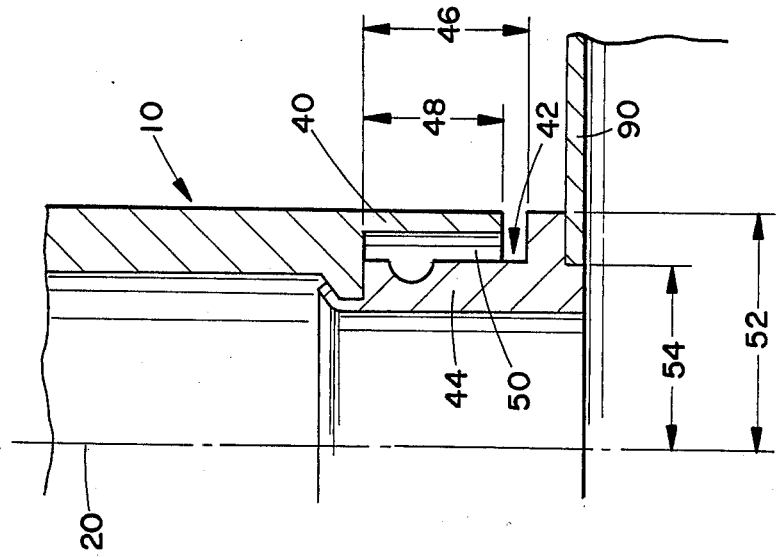
FIG. 2 is a detailed sectional view of the overhanging skirt region of the swivel in FIG. 1.

With reference to FIG. 2, one of the first and second swivel members has a depending skirt 40 and the other has an annular recess 42 extending around a cylindrical bearing surface portion 44. The recess has a height 46 which is greater than a height 48 of the skirt. The difference in height or lower gap width is selected in accordance with the beading or wetting properties of the selected coating material. Specifically, the width of the lower portion of gap 50 is selected such that the coating material does not bridge or wet across the gap. A gap of 0.05 inches (1.25 mm) has been found to be satisfactory. Further, the skirt has an inner surface, a radius 52 from the swivel axis. The annular recess and the bearing surface supporting portion 44 have an outward facing surface, a radius 54 from the swivel axis. The two radii are different to define a width of an upper portion of the gap 50 in accordance with the wetting properties of the selected coating material.

The bearing surface supporting portion 44 defines an annular recess or break zone 56. If the coating material forms a continuous surface across a peripheral interface or edge 58 between the first and second bearing surfaces at an outer radius of the smaller bearing surface, the initial rotation of the swivel members may cause the coating surface to crack, split, peel, chip, or the like. The break groove 56 provides a sharp edge or natural termination point for any cracks or splits before they become visible through the gap 50 and become visible from the exterior. The extra surface of the groove or radius 56 over a straight cylindrical wall provides additional surface area that seeping lubricants, etching solutions, and other liquids can wet or cover before becoming visible. In the preferred embodiment, the first and second bearing surfaces have the same radius as the radius 52 of the skirt and the radius 54 of the bearing surface supporting portion to maximize the area of the bearing surfaces and swivel assembly stability.

With continuing reference to FIG. 1, the second swivel member 30 further includes a second male swivel connection assembly which is identical to the first in the illustrated embodiment. Like elements are described with the same reference numerals followed by a prime (').

A third swivel member 60 has an outer cylindrical wall 62 defined in inner passage 64. An inner peripheral collar 66 receives a ferrule 36' of the second swivel member which is swaged thereto. In this manner, bearing surfaces 68 and 38' are brought into firm frictional engagement. The third swivel member has an appending skirt 70 which is received adjacent an annular recess 72 on the second swivel member such that a gap 74 is defined therebetween.

The mounting means B includes a first tubular nipple 80 for mounting the first swivel member 10 to a wall box 82. A second mounting member or nipple 84 connects the third swivel member with the wall box 82. Nuts or other anchoring means 86 anchor the nipples 80 and 84 to the wall box 82. To mount the first swivel assembly A to lamp bases, rods, and the like other conventional mounting assemblies may be used.

The arm assembly includes a first tubular arm 90 which is connected to the second swivel member 30. The first arm member 90 defines a wire receiving passage 92 therethrough in communication with the second wire receiving passage 34, the first wire receiving passage 14, and through the nipple 80 to the wall box 82.

The second swivel assembly D includes a first female member 100 that has a cylindrical peripheral wall 102 and defines a wire receiving passage 104 therethrough. An annular collar 106 projects into the wire receiving passage 104 defining a central aperture therein. A depending skirt 108 extends downward below a first annular bearing surface 110.

A second swivel member 120 has a cylindrical, peripheral surface 122 and defines a wire receiving passage 124 centrally therein. A ferrule 126 extends through the annular collar 106 of the first swivel member and is crimped thereto such that a second member bearing surface 128 is urged into firm, frictional engagement with the first bearing surface 110.

The second swivel member further includes a bearing surface supporting portion 130 surrounded by an annular recess 132 defined by an inner peripheral wall 134 and a lower peripheral wall or edge 136. An annular gap 138 is defined between the skirt 108 and the inner and lower peripheral walls, respectively. The second bearing surface is smaller than the first bearing surface by the thickness of the peripheral gap 138.

With continuing reference to FIG. 1 and further reference to FIG. 3, a circumferential rotation limiting means 140 limits rotation of the first and second swivel members relative to each other to inhibit wire abrasion and overtwisting. The rotation limiting assembly includes a peripheral groove or ball race 142 in the peripheral wall 134. The skirt 108 defines a pair of enlarged pockets 144a, b therein. A pair of hardened steel ball members 146a, b is received in the annular groove 142 and the pocket 144a, b. A hardened steel pin 148 is knurled and pressed into the ball race to prevent dislodging when the balls 146a, b engage the pin at the limits of rotation. By appropriately selecting the placement of the pockets and the pin, the alignment of the arms at the limits of rotation are selectively set. For example, the arms may be aligned at one limit. If the pockets 144a, b are diametrically opposite and the same as the diameter of the balls 146a, b, then the two swivel members can rotate by 180° less the arc defined by the balls 146a, b and projection 148. By increasing the size of the pockets 144a, b such that the balls can roll peripherally therealong or the arc between the pockets, the degrees of rotation can be increased. By rotating the ball race circumferentially, the interaction of the balls and the pin do not place forces on the flared or swaged ferrule 126 that tend to strain the connection, i.e. change the torque.

The arm assembly C further includes a second tubular arm 150 that defines a wire receiving passage 152 therein. The second arm extends from the second swivel D to a light fixture mounting member 154 in which the light fixture E is mounted.

Figure 4:
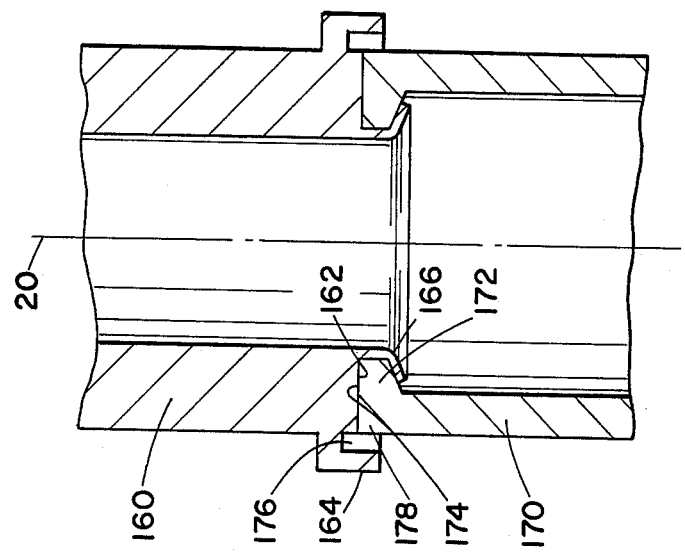
FIG. 4 is a sectional view of an alternate embodiment of a swivel assembly in accordance with the present invention; and, FIG. 5 is a sectional view of another alternate swivel assembly embodiment.

With reference to the alternate embodiment of FIG. 4, it is to be appreciated that either swivel member may carry the skirt. A first swivel member 160 has a first bearing surface 162 surrounded by a peripherally depending skirt 164. A ferrule 166 extends downward from the first swivel member 160 from the center of the bearing surface 162. A lower swivel member 170 defines an annular collar 172 around which the ferrule member 166 is crimped. A second bearing surface 174 of the second swivel member is pressed into frictional engagement with the first bearing surface 162. An annular gap 176 is defined between the skirt 164 and a bearing surface supporting portion 178 of the second swivel member 160. The skirt 164 depends downward from the first bearing surface 162 such that a peripheral interface 180 between first and second bearings surfaces is obstructed from view.

Figure 5:
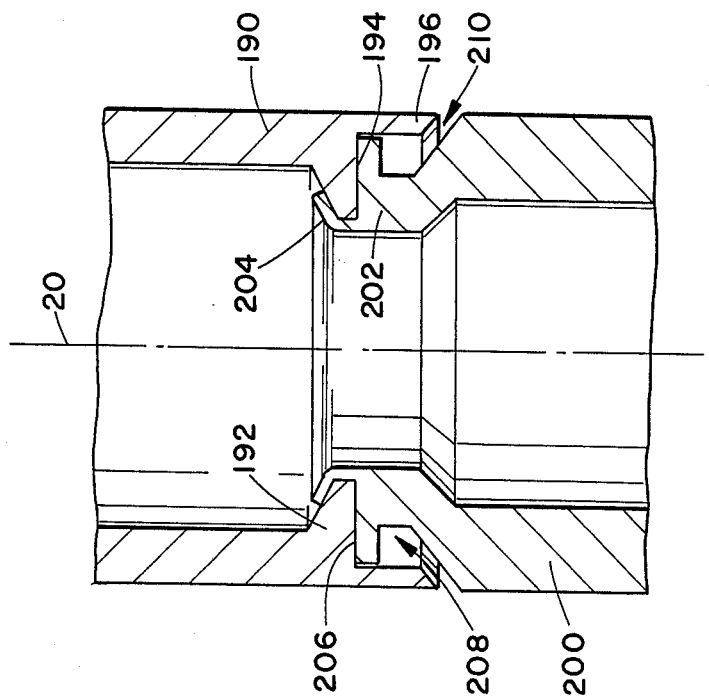

With further reference to the alternate embodiment of FIG. 5, a first swivel member 190 has an annular collar 192 that defines a first bearing surface 194 along an outer face thereof. A skirt 196 depends peripherally around the first bearing surface. A second swivel member 200 has a bearing surface supporting portion 202 on which a ferrule 204 is centrally disposed. A second bearing surface 206 extends outward from the ferrule and is cantilevered beyond the bearing surface supporting portion such that a peripheral recess or groove 208 is defined. An annular gap 210 is defined between the skirt 196 and the bearing surface portion 202.

The invention has been described with reference to the preferred embodiments. Obviously, modifications and alterations will occur to others upon reading and understanding the preceding specification. It is intended that the invention be construed as including all such alterations and modifications insofar as they come within the scope of the appended claims or the equivalents thereof.

Having thus described the preferred embodiments, the invention is now claimed to be:

1. A swivel arm assembly comprising first and second swivel members that are interconnected for relative rotational movement about a swivel axis;
the swivel members having frictionally engaging first and second bearing surfaces, respectively disposed perpendicular to the swivel axis, the first swivel member having a skirt depending therefrom and extending beyond the engaging bearing surfaces, the skirt being displaced from the second swivel member to define an annular gap therebetween which is sufficiently large to inhibit bridging of the gap by coating materials;
a mounting means for mounting one of the first and second swivel members to a supporting structure; and,
an arm connected with the other swivel member.

2. An arm assembly for supporting a lighting fixture or the like, the assembly comprising:
a swivel assembly including:
a first swivel member having a first peripheral surface and a first bearing surface;
a second swivel member having a second peripheral surface and a bearing surface supporting portion that supports a second bearing surface;
a swivel member connecting means for connecting the first and second swivel members together for rotation relative to each other about a swivel axis such that the first and second bearing surfaces are in firm frictional engagement with each other;
a peripheral bearing surface interface edge extending peripherally around an area of interengagement between the first and second bearing surfaces;
a depending skirt extending from the first swivel member beyond the bearing surface peripheral edge and spaced from the bearing surface support portion and the second peripheral surface to define a gap therebetween, the gap being sufficiently large that bridging of the gap by coating materials is inhibited;
a means for defining a passage suitable for receiving a wire through the first swivel member, the second swivel member, and the swivel member connecting means;
a mounting means for mounting one of the first and second swivel members to a supporting structure; and,
an arm connected with the other of the first and second swivel members such that the arm swivels about the swivel axis relative to the supporting structure, the arm defining a passage therethrough and being interconnectable with the lighting fixture or the like.

3. The arm assembly as set forth in claim 2 wherein the first peripheral surface, the second peripheral surface, and a peripheral surface of the skirt each lie on a common circular cylinder centered on the swivel axis.

4. The arm assembly as set forth in claim 2 wherein the bearing surface supporting portion has a peripheral groove extending therearound.

5. The arm assembly as set forth in claim 4 further including a ball member disposed in the peripheral groove, a ball retaining pocket defined in the skirt, and a ball engaging portion projecting into the groove to limit rotational movement of the first and second swivel members about the swivel axis.

6. The arm assembly as set forth in claim 2 further including a second swivel assembly connected to the arm.

7. The apparatus as set forth in claim 2 further including a third swivel member having a third peripheral surface and a third bearing surface;

a second connecting means for connecting the third swivel member to the second swivel member such that the third bearing surface frictionally engages another bearing surface defined on the second swivel member; and, a skirt extending from one of the second and third swivel members beyond an edge extending peripherally around an area of frictional interengagement between the third and another bearing surfaces.

8. An arm assembly comprising:

a first swivel member having a cylindrical first peripheral surface, defining a first interior passage having an annular collar projecting into the interior passage, and having a first generally planar bearing surface extending generally perpendicular to a swivel axis;

a second swivel member having a cylindrical second peripheral surface defining an interior passage therein, having a second bearing surface disposed generally perpendicular to the swivel axis, having an extending ferrule rotatably received within the first member peripheral collar and crimped thereto such that the first and second bearing surfaces are in firm frictional engagement but permitting the first and second swivel members to rotate relative to each other about the swivel axis;

one of the swivel members including a cylindrical portion for supporting the associated bearing surface thereon and the other bearing member having a projecting skirt projecting beyond the engaging bearing surfaces, the skirt having an inner surface which is spaced from an outer surface of the cylindrical bearing surface supporting portion and the one member cylindrical peripheral surface to define an annular gap therebetween;

an arm interconnected with at least one of the first and second swivel members.

9. The arm assembly as set forth in claim 8 wherein the skirt has an outer peripheral surface which lies along a common circular cylinder with the first member peripheral surface and the second member peripheral surface.

10. The arm assembly as set forth in claim 8 further including an annular groove extending peripherally around the bearing surface supporting portion.

11. The arm assembly as set forth in claim 10 further including:

a pocket defined in the skirt adjacent the annular groove;

a rolling member rotatably received in the pocket and the annular groove; and, a stop member mounted in the groove for interacting with the rolling member to limit relative rotation of the swivel members.

12. The arm assembly as set forth in claim 11 further including a second pocket defined in the skirt and a second rolling member rotatably received in the second pocket and the annular groove.

13. A method of assembling a swivel assembly comprising:

fashioning a first swivel member which has an outer peripheral surface, an inner passage, a collar projecting annularly inward into the inner passage, and a generally flat bearing surface;

fashioning a second swivel member which has an outer peripheral surface, an inner passage, a projecting ferrule, and a second bearing surface extending peripherally around the extending ferrule;

fashioning one of the first and second swivel members such that it has a generally cylindrical portion for supporting its associated one bearing surface and fashioning the other of the swivel members such that it has a depending skirt extending beyond its associated other bearing surface, the depending skirt having an interior cylindrical surface of larger radius than the cylindrical bearing surface supporting portion;

inserting the projecting ferrule through the peripheral collar and crimping the ferrule therearound such that the first and second bearing surfaces are urged into firm frictional engagement and an annular gap is defined between the skirt and the bearing surface supporting portion and one swivel member peripheral surface;

connecting an arm to at least one of the swivel members;

coating the arm and the first and second connected swivel members with a coating material.

14. The method as set forth in claim 13 wherein a peripheral gap defined between the skirt inner surface and the bearing surface supporting portion outer surface is sufficiently large that powder coating material does not bridge thereacross.

15. The method as set forth in claim 13 wherein the coating step includes applying a powder coating to the swivel members and arm.

16. The method as set forth in claim 13 wherein the fashioning steps include fashioning the first and second swivel member peripheral surfaces and the skirt with a common diameter.

17. The method as set forth in claim 13 wherein the fashioning steps include fashioning the bearing surface supporting portion with an annular guard disposed behind the skirt for inhibiting plating liquids that may become trapped between the bearing surfaces from dripping therepast.

* * * * *